United States Patent

[11] 3,562,412

[72] Inventor Emory C. Callaway
Chicago, Ill.
[21] Appl. No. 810,617
[22] Filed Mar. 26, 1969
[45] Patented Feb. 9, 1971
[73] Assignee Admiral Corporation
Chicago, Ill.
a corporation of Delaware

[54] VARIABLE COUPLING IF AMPLIFIER INCLUDING A DOUBLE-TUNED CIRCUIT
6 Claims, 3 Drawing Figs.

[52] U.S. Cl. ........................................................ 178/5.4
[51] Int. Cl. ........................................................ H04n 5/50, H04n 9/00
[50] Field of Search ........................................... 178/5.4, 5.4 (TEST), 5.4(MC), 5.8, 5.8(A)

[56] References Cited
UNITED STATES PATENTS
2,990,447 6/1961 Stark et al. .................... 178/5.4

*Primary Examiner*—Richard Murray
*Assistant Examiner*—John C. Martin
*Attorney*—Nicholas A. Camasto

ABSTRACT: The first IF stage in a color television receiver comprises a transistor biased for forward AGC operation and having a collector impedance varying inversely with the strength of a selected television signal. A double-tuned circuit, incorporating the transistor collector impedance, displays a frequency characteristic having a maximum response approximately midway between two preselected optimum frequencies when the collector impedance is small, and maximum responses near both optimum frequencies when the collector impedance is large, whereby the receiver can be desirably fine tuned even under weak signal conditions.

INVENTOR.
Emory C. Callaway
BY Nicholas A. Camasto
ATTY.

VARIABLE COUPLING IF AMPLIFIER INCLUDING A DOUBLE-TUNED CIRCUIT

This invention relates to transistorized IF circuitry in color television receivers. As is well known in the art, such circuitry includes a plurality of tuned amplifier stages for amplifying an IF television signal having a band of frequencies including an intermediate picture carrier frequency and an intermediate color subcarrier frequency. This IF signal is produced by electronically mixing a locally generated oscillatory signal with a selected television signal in conventional manner. IF circuitry of the type described also includes various audio trapping networks for aiding in the separation of the IF picture carrier from an accompanying intermediate frequency sound carrier and for precluding interference from other undesired carrier signals.

In order to obtain high fidelity color images, the above mentioned picture carrier and color subcarrier frequencies must be adjusted for most favorable response. This is generally accomplished by adjusting the frequency of the locally generated oscillatory signal until the intermediate picture carrier and color subcarrier frequencies are equal to respective preselected optimum frequencies.

In accordance with conventional television design, the viewer can make this adjustment by (1) setting a color intensity control for minimum saturation, (2) adjusting a fine tuning control until the clearest monochrome image is formed, indicating the carrier frequencies are optimized for most favorable response, and (3) readjusting the intensity and tint controls for natural colors.

In the event a relatively weak signal is selected, however, "-television snow," produced by high frequency noise accompanying the received signal, interferes with the televised image. As a result, it is difficult for the viewer to determine the optimum carrier and subcarrier frequencies by simply adjusting the fine tuning control until a clear monochrome image is produced. Thus, under weak signal conditions, the viewer may set the fine tuning control to any position which yields a relatively distinct black and white image. In particular, such an image is obtained when the tuning control is erroneously adjusted until the picture carrier is shifted into coincidence with a point on the IF amplifier frequency characteristic corresponding to a maximum, but not the optimum, response, and as a result, the viewer may mistakenly think he has properly fine tuned his receiver.

Unfortunately, if the picture carrier is shifted in the manner described above, the modulated color components centered about the intermediate color subcarrier frequency are moved toward the audio trapping networks, thereby deemphasizing the color information. In this event, at best only pale color images can be produced even when the color intensity control is adjusted for maximum saturation.

The circuit of the invention obviates this deficiency in the prior art by providing means which enable the viewer to optimize the above mentioned carrier frequencies, under weak signal conditions, by simply adjusting the fine tuning control until a relatively clear monochrome image is produced. The circuit develops a positive AGC potential, directly proportional to the strength of the selected television signal, and passes it to the input of the first IF transistor. This transistor is biased for forward AGC operation, whereby the transconductance, and hence the gain of the transistor, decreases with increasing emitter current. Thus, when the AGC potential becomes more positive, for example, the emitter current increases causing a proportional decrease in both the gain and the output impedance of the transistor.

The circuit of the invention includes a double-tuned circuit having a primary circuit incorporating the output impedance of the first IF transistor and a secondary circuit coupled to the second stage of the IF amplifier. Since the Q of the primary circuit, and hence the mutual coupling between the primary and secondary windings, changes in accordance with variations in the output impedance, the frequency response characteristic of the double-tuned circuit changes accordingly.

For example, when the output impedance of the first IF transistor is relatively small (under strong signal conditions), the double-tuned circuit is undercoupled and displays a frequency characteristic having a maximum response at an intermediate frequency approximately centered between the preselected optimum frequencies. On the other hand, when the output impedance of the transistor is relatively large (under weak signal conditions), the double-tuned circuit becomes overcoupled and displays a frequency characteristic having maximum responses near both optimum frequencies. Thus, if a weak television signal is selected, the output impedance of the first IF transistor increases causing the double-tuned circuit to display a frequency characteristic corresponding to the overcoupled condition described above.

Since the double-tuned circuit displays a frequency characteristic having maximum responses near the optimum frequencies, the viewer can adjust the receiver for most favorable response, even under weak signal conditions, by simply turning the fine tuning control until the clearest monochrome picture is obtained. As a result, the modulated color components centered about the intermediate color subcarrier frequency will not be inadvertently shifted toward the audio trapping networks and therefore, color saturation will remain substantial. In addition, the bandwidths of the video and color passbands are substantially reduced under weak signal conditions, and thus "television snow" produced by high frequency noise accompanying the selected television signal is considerably minimized.

Accordingly, the primary object of this invention is to provide improved means for fine tuning color television receivers during weak signal reception.

Another object of this invention is to provide, for use in a color television receiver, a transistor biased for forward AGC operation and coupled to a double-tuned circuit having a frequency response characteristic, under weak signal conditions, displaying maximum responses near the intermediate frequencies designated for optimum video and color reproduction such that the viewer can easily and accurately fine tune the receiver.

A further object of this invention is to provide, for use in a color television receiver, an IF transistor biased for forward AGC operation and having an output impedance varying inversely with signal strength, whereby the frequency characteristic of a double-tuned circuit coupled to the transistor varies in accordance with changes in the output impedance to produce, under weak signal conditions, maximum responses at the frequencies designated for optimum response.

A feature of this invention resides in means for reducing the bandwidths of the color and video passbands when a relatively weak television signal is selected, thereby reducing high frequency noise accompanying the selected television signal and enhancing picture fidelity.

Other objects, features and advantages of this invention will be apparent upon reading the following description in conjunction with the accompanying drawing in which.

Figure 1:
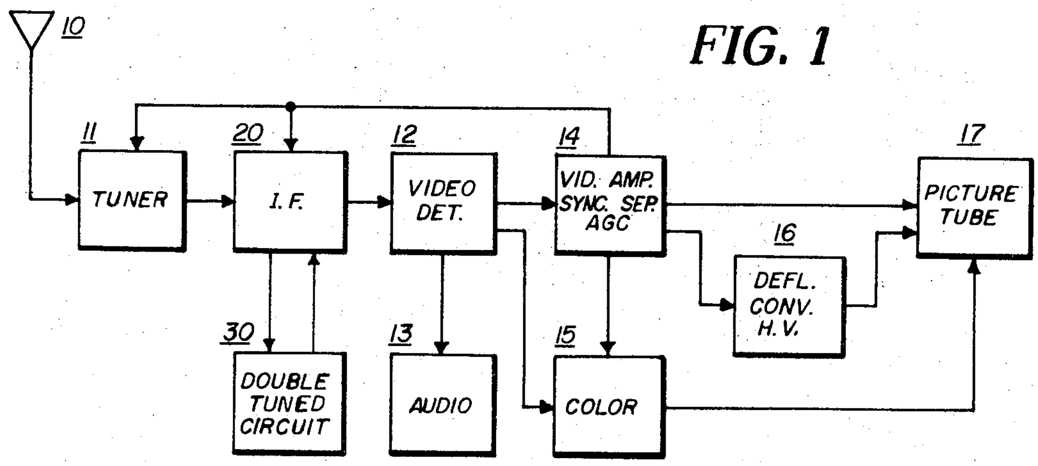
FIG. 1 is a block diagram of a conventional television receiver.

Referring now to FIG. 1, a color television receiver includes an antenna 10 which receives a plurality of transmitted television signals and couples them to a television tuner 11. Tuner 11 is conventional and may contain an RF amplifier for selectively amplifying one of the received television signals, a local oscillator and a mixer. The local oscillator, commonly tuned with the RF amplifier, generates an oscillatory signal of such frequency that when it is combined with the RF signal in the mixer, a predetermined intermediate frequency (IF) signal is produced. This IF signal is well known in the television art and comprises a 45.75 MHz. modulated picture carrier, a 41.25 MHz. modulated sound carrier, and modulated color components centered about a 42.17 MHz. suppressed color subcarrier.

Tuner 11 is connected to an IF amplifier 20 comprising a plurality of transistorized amplifier stages for amplifying the IF signal. IF amplifier 20 further includes various trapping networks for attenuating the sound carrier and accompanying sound components in order to prevent undesirable cross-modulation with the 45.75 MHz. picture carrier. A double-tuned circuit 30 is connected between the first and second stages of the IF amplifier, and as explained below, enables the viewer to desirably fine tune the receiver under weak signal conditions.

A video detector 12 connected to IF circuit 20 receives the amplified IF signal, and upon demodulation thereof, produces a composite video signal containing monochrome video information, known in the art as luminance signal, monochrome synchronizing information and color information. Video detector 12 may also include audio detection circuitry and means for passing the recovered sound information to an audio circuit 13. Audio circuit 13 contains conventional circuitry, including a loudspeaker, for reproducing the sound portion of the television program.

Video detector 12 also passes a portion of the composite video signal to Block 14 comprising a video amplifier, a sync separator and an automatic gain control. The video amplifier amplifies the luminance signal and passes it to a conventional color television picture tube 17. The sync separator in Block 14 separates the monochrome synchronizing information from the composite video signal and passes this information to a Block 16 which may contain horizontal and vertical deflection circuitry, dynamic convergence circuitry and high voltage circuitry. These various circuits are coupled to television picture tube 17 for assuring proper electron beam scanning across the picture screen. The automatic gain control in Block 14 is conventional, and detects the amplitude of the synchronizing signal for producing an AGC potential proportional to the strength of the selected television signal. The AGC potential is used to vary the gain of both the RF and IF amplifiers and as explained below, is also used to adjust the frequency response characteristic of double-tuned circuit 30.

The color television receiver further includes a color circuit 15 comprising a color synchronizing circuit and a chrominance channel. A portion of the composite video signal is passed from video detector 12 to the color synchronizing circuit for reestablishing the color subcarrier in a conventional manner. The chrominance channel operates under the control of the color synchronizing circuit for demodulating the color information. Upon amplification, the demodulated color information is passed to picture tube 17, where it is combined with the luminance signal to produce a color picture.

Figure 2:
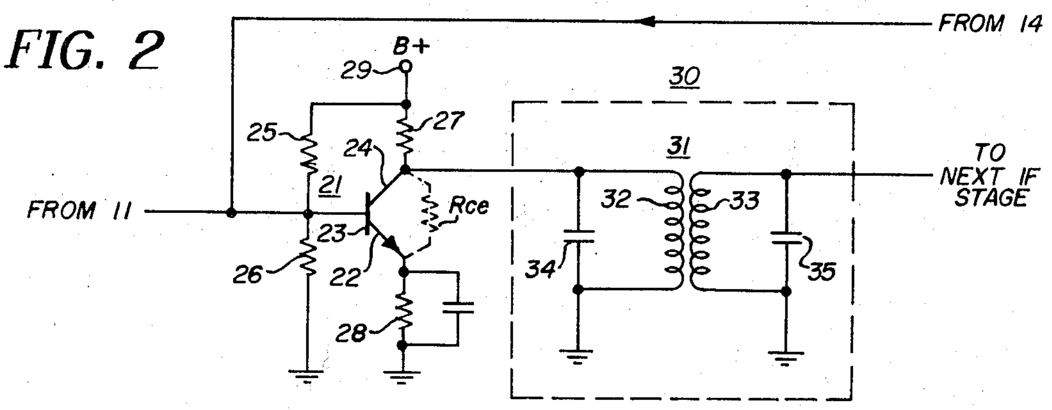
FIG. 2 is a detailed circuit diagram of the invention showing a portion of the IF amplifier represented by block 20 in Fig. 1 and the double-tuned circuit represented by block 30 in FIG. 1.

FIG. 2 shows the first stage of the IF amplifier and includes a transistor 21 having an emitter electrode 22, a base electrode 23 and collector electrode 24. Transistor 21 is biased for forward AGC operation by three biasing resistors 25, 26 and 27. Biasing resistor 27 is connected between collector electrode 24 and a B+ voltage supply 29, resistor 25 is connected between base electrode 23 and voltage supply 29 and resistor 26 is connected between base electrode 23 and a point of reference potential, hereafter referred to as ground. A stabilizing resistor 28, having a bypass capacitor parallely coupled thereto, is connected between emitter electrode 22 and ground.

Transistor 21 also has a collector or output impedance, represented by a phantom line resistor Rce and appearing between collector electrode 24 and emitter electrode 22. It is emphasized that resistor Rce is an inherent property of transistor 21 and not physically present in the circuit, though for purposes of description, it is represented as a separate circuit element.

Double-tuned circuit 30 comprises a transformer 31 having a primary winding 32 and a secondary winding 33 mutually coupled thereto. A grounded capacitor 34 is connected in parallel with winding 32 and a grounded capacitor 35 is connected in parallel with winding 33. The ungrounded end of capacitor 34 is connected to the collector electrode of transistor 21, whereby resistor Rce, winding 32 and capacitor 34 comprise a primary circuit, and winding 33 and capacitor 35 comprise a secondary circuit which is connected to the next stage of the IF amplifier (not shown).

As discussed above, an AGC potential is coupled from Block 14 to IF amplifier 20, in particular to base electrode 23 of transistor 21. In accordance with conventional forward AGC operation, both the gain and the output impedance of the transistor vary inversely with the magnitude of the AGC potential which is a function of the television signal level. Thus, when the strength of the selected television signal decreases, for example, the impedance between the collector electrode and the emitter electrode Rce increases by a proportional amount. Since Rce is incorporated in the primary circuit comprising capacitor 34 and primary winding 32, the Q of the primary circuit also increases, and as a result, windings 32 and 33 become overcoupled. Conversely, when signal strength increases, the resistance Rce, and hence the Q of the primary circuit decreases, whereby windings 32 and 33 become substantially undercoupled.

Figure 3:
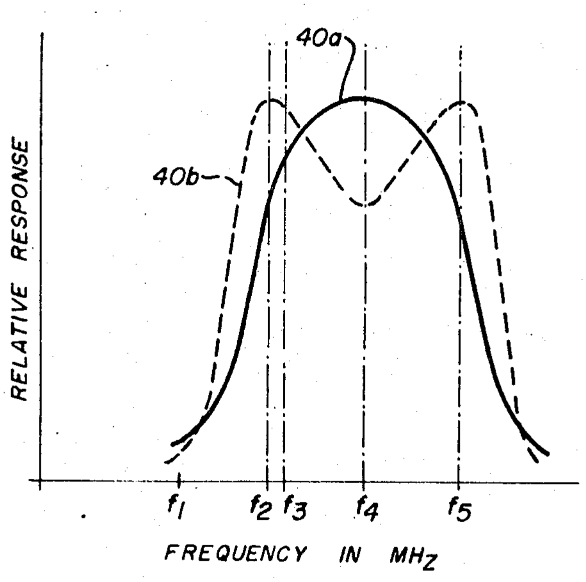
FIG. 3 is a graphic representation of the frequency-response characteristics of the double-tuned circuit shown in detail in FIG. 2.

The effects of changing the coupling between windings 32 and 33 are best explained by referring to FIG. 3 in which a graph having an ordinate representing the relative response of double-tuned circuit 30 and an abscissa representing a range of relevant frequencies, including *f1*, *f2*, *f3*, *f4*, and *f5*, is shown. Frequencies *f3* and *f5* represent the optimum frequencies described above, and in accordance with conventional receiver design, are equal to 42.17 MHz. and 45.75 MHz., respectively. F1 is equal to 41.25 MHz. and represents the frequency of the audio carrier while *f2* and *f4* are equal to 41.75 MHz. and 43.75 MHz., respectively.

A frequency response characteristic 40*a*, corresponding to the condition where the windings of transformer 31 are substantially undercoupled, has a single maximum at *f4* and half power frequencies at *f2* and *f5*. Similarly, a frequency response characteristic 40*b*, resulting when windings 32 and 33 are overcoupled, has a pair of maxima at *f2* and *f5*. From characteristic 40*b*, it should be apparent that the points of maximum response almost coincide with optimum frequencies *f3* and *f5*.

Normally, the television receiver is tuned to a relatively strong signal, and as a result, the AGC potential developed by the video circuit is relatively large. When applied to transistor 21, this relatively large AGC potential reduces the gain and the output impedance Rce. As discussed above, the transformer windings in the double-tuned circuit are substantially undercoupled when the resistance Rce is small, and as a result, the frequency response characteristic of the double-tuned circuit is similar to curve 40*a* in FIG. 3. Thus, in accordance with conventional IF amplifier design, a clear monochrome image is produced when the picture carrier frequency, and the color subcarrier frequency are adjusted for 45.75 MHz. and 42.17 MHz., respectively. Thereafter, only the color intensity and tint controls need be adjusted to obtain high fidelity color images.

As discussed above, under weak signal conditions, without the circuit of the invention, the intermediate picture carrier frequency *f5* may be inadvertently adjusted to coincide with a point on the frequency characteristic of the IF amplifier corresponding to a maximum, but not optimum, response. Thus, *f5* would be shifted near the point on the abscissa occupied by *f4*, and consequently, the intermediate color subcarrier frequency *f3* would be shifted toward the audio trap in the vicinity of *f1*. Since the response at *f1* is relatively low, only pale colors, at best, can be reproduced under these conditions.

The circuit of the invention prevents deemphasis of the color information under weak signal conditions. For example, when the receiver is tuned to a relatively weak television signal, the AGC potential is reduced, causing the gain and the output impedance Rce of the first IF transistor to increase. The transformer windings in the double-tuned circuit become overcoupled when Rce is relatively large, and consequently, the frequency response characteristic of the double-tuned circuit appears similar to curve 40*b* in FIG. 3. Since the relative responses at the optimum frequencies *f*3 and *f*5 are very nearly maximized under weak signal conditions, the clearest monochrome image will be obtained when the color subcarrier frequency and picture carrier frequency are equal to 42.17 MHz. and 45.75 MHz., respectively. Since these values coincide with the preselected optimum frequencies, the receiver can be accurately fine tuned, even under weak signal conditions, by simply adjusting the fine tuning control until the clearest monochrome image is obtained.

In view of the foregoing, it should also be apparent that the bandwidth associated with each peak in characteristic 40*b*, is considerably narrower than the bandwidth of characteristic 40*a*. Since noise interference is proportional to the bandwidth, the invention produces the desirable effect of reducing "-television snow" which so often interferes with weak signal reproduction. Thus, the circuit of the invention emphasizes both the 42.17 MHz. color subcarrier frequency and the 45.75 MHz. picture carrier frequency while reducing high frequency noise, thereby permitting the viewer to accurately fine tune the receiver even under weak signal conditions.

I claim:

1. In a color television receiver comprising heterodyning means for producing, upon receipt of a selected television signal, an IF signal having a picture carrier frequency and a jointly adjustable color subcarrier frequency, the combination of: transistorized IF amplifier means coupled to said heterodyning means; automatic gain control means, coupled to said IF amplifier means, producing an AGC potential proportional to the strength of said selected television signal; said IF amplifier means displaying an output impedance varying inversely with said AGC potential; double-tuned means, coupled to said IF amplifier means, displaying a frequency response characteristic covering a first optimum frequency and a second optimum frequency; said frequency response characteristic, varying in accordance with said output impedance, displaying a maximum response substantially centered between said first and said second optimum frequencies when said output impedance is small, and maximum responses near said first and said second optimum frequencies when said output impedance is large.

2. The combination as set forth in claim 1, wherein said television receiver further includes a picture tube for displaying a televised image; said picture carrier frequency being adjusted into equivalence with said first optimum frequency when said televised image best satisfies predetermined criteria, including minimal interference and clearest picture, whereby said criteria are used to properly adjust said picture carrier frequency under both weak and strong signal conditions.

3. The combination as set forth in claim 2, wherein said double-tuned means comprise a primary circuit and a secondary circuit mutually coupled thereto; said double-tuned means being undercoupled when said selected television signal is weak, and overcoupled when said television signal is strong, whereby said double-tuned means display maximum responses near said first and second optimum frequencies when overcoupled.

4. The combination as set forth in claim 3, wherein said double-tuned means display a wide bandwidth when undercoupled and relatively narrow bandwidths, substantially centered about said first and second optimum frequencies, respectively, when overcoupled whereby noise accompanying said IF signal about said first and second optimum frequencies is minimized under weak signal conditions.

5. The combination as set forth in claim 4 wherein said IF amplifier means include a transistor having collector electrode, biased for forward AGC operation; said electrode displaying a collector impedance for establishing said output impedance; said transistor becoming more conductive, thereby reducing said collector impedance and said output impedance, when said selected television signal is strong, and less conductive, thereby increasing said collector impedance and said output impedance, when said television signal is weak.

6. In a color television receiver comprising tuning means adjustably responsive to any one of a plurality of television signals having a modulated picture carrier and a suppressed color subcarrier, heterodyning means mixing a selected one of said television signals with a locally generated oscillatory signal for producing an IF signal having a picture carrier frequency and a color subcarrier frequency, and automatic gain control means producing an AGC potential proportional to the strength of said selected one of said television signals, the combination of: IF transistor means biased for forward AGC operation and having an emitter electrode, a base electrode coupled to said heterodyning means, and a collector electrode displaying collector impedance varying inversely with said AGC potential; double-tuned means comprising a primary circuit, incorporating said collector impedance and a secondary circuit, the coupling between said primary circuit and said secondary circuit varying in accordance with said collector impedance; said double-tuned means displaying a frequency-response characteristic having a maximum response at a frequency substantially centered between said picture carrier frequency and said color subcarrier frequency when said primary circuit and said secondary circuit are undercoupled, and a frequency-response characteristic displaying maximum responses near said picture carrier frequency and said color subcarrier frequency, when said primary circuit and said secondary circuit are overcoupled, whereby said picture carrier frequency and said color subcarrier frequency are emphasized when said selected one of said television signals is relatively weak.